United States Patent
Shimomura (10) Patent No.: US 11,718,740 B2
(45) Date of Patent: Aug. 8, 2023

(54) METHOD FOR PRODUCING THERMOPLASTIC ELASTOMER COMPOSITION

(71) Applicant: SUMITOMO CHEMICAL COMPANY, LIMITED, Tokyo (JP)

(72) Inventor: Shinichiro Shimomura, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/894,776

(22) Filed: Aug. 24, 2022

(65) Prior Publication Data

US 2023/0071344 A1 Mar. 9, 2023

(30) Foreign Application Priority Data

Aug. 26, 2021 (JP) .................................. 2021-137840

(51) Int. Cl.
| | | |
|---|---|---|
| C08L 23/16 | (2006.01) | |
| C08J 3/00 | (2006.01) | |
| C08L 53/00 | (2006.01) | |

(52) U.S. Cl.
CPC .............. *C08L 23/16* (2013.01); *C08J 3/005* (2013.01); *C08L 53/00* (2013.01); *C08J 2323/16* (2013.01);
(Continued)

(58) Field of Classification Search
CPC ...... C08L 23/16; C08L 53/00; C08L 2203/30; C08L 2205/025; C08L 2205/035;
(Continued)

(56) References Cited

U.S. PATENT DOCUMENTS

2011/0218283 A1* 9/2011 Bokhari .................. C08L 23/16
                                                                 525/240
2012/0295057 A1 10/2012 Ohtani
(Continued)

FOREIGN PATENT DOCUMENTS

JP 2001-123027 A 5/2001

OTHER PUBLICATIONS

European Search Report for related case EP4140827A1, submitted on Feb. 1, 2023. (Year: 2023).*
European Search Opinion for related case EP4140827A1, submitted on Feb. 1, 2023. (Year: 2023).*

*Primary Examiner* — Brian Handville
(74) *Attorney, Agent, or Firm* — Meunier Carlin & Curfman LLC (57) ABSTRACT

Provided is a method for producing a thermoplastic elastomer composition that can form a molded article having both good appearance and high stiffness. The method for producing a thermoplastic elastomer composition comprises the following first step and second step, wherein the produced thermoplastic elastomer composition contains 5 mass % or less of a mineral oil (C): first step: a step of melt-kneading polypropylene (A-1) and an ethylene-based copolymer rubber (B) in the presence of an organic peroxide, the polypropylene (A-1) being polypropylene of which 20° C. xylene insoluble fraction has an intrinsic viscosity $[\eta_{cxis}]$ of 0.1 dl/g or more and less than 1.5 dl/g; and second step: a step of further adding polypropylene (A-2) of which 20° C. xylene insoluble fraction has an intrinsic viscosity $[\eta_{cxis}]$ of 1.5 dl/g or more and 7 dl/g or less, and melt-kneading the resulting mixture.

19 Claims, 1 Drawing Sheet

(52) U.S. Cl.
CPC ........ *C08J 2353/00* (2013.01); *C08J 2423/08* (2013.01); *C08J 2423/12* (2013.01); *C08J 2423/16* (2013.01); *C08J 2491/00* (2013.01); *C08L 2203/30* (2013.01); *C08L 2205/025* (2013.01); *C08L 2205/035* (2013.01); *C08L 2207/04* (2013.01); *C08L 2207/322* (2013.01)

(58) Field of Classification Search
CPC .......... C08L 2207/04; C08L 2207/322; C08L 23/10; C08L 23/0815; C08J 3/005; C08J 2323/16; C08J 2353/00; C08J 2423/08; C08J 2423/12; C08J 2423/16; C08J 2491/00; C08J 2323/08; B60R 21/207
See application file for complete search history.

(56) References Cited

U.S. PATENT DOCUMENTS

| | | | |
|---|---|---|---|
| 2015/0274950 A1 | 10/2015 | Matsunaga | |
| 2016/0032089 A1* | 2/2016 | Takahashi | C08L 23/12 525/232 |
| 2016/0244600 A1* | 8/2016 | Kurokawa | C08K 3/18 |
| 2018/0312616 A1* | 11/2018 | Kida | C08K 3/22 |
| 2018/0312675 A1* | 11/2018 | Inoue | C08L 23/12 |
| 2019/0193904 A1* | 6/2019 | Toyoshima | B65D 65/40 |
| 2021/0292529 A1* | 9/2021 | Kanemori | C08L 53/00 |

\* cited by examiner

METHOD FOR PRODUCING THERMOPLASTIC ELASTOMER COMPOSITION

CROSS REFERENCE TO RELATED APPLICATIONS

This application is a Paris Convention Patent Application which claims the benefit of priority to Japanese Application No. 2021-137840, filed Aug. 26, 2021, which is incorporated by reference herein in its entirety.

BACKGROUND OF THE INVENTION

Field of the Invention

The present disclosure relates to a thermoplastic elastomer composition.

Description of the Related Art

Thermoplastic elastomer compositions containing a propylene-based resin, an ethylene-α-olefin-non-conjugated diene copolymer rubber, and other components are used as materials of airbag covers (e.g., see JP-A-2012-224837).

SUMMARY OF THE INVENTION

Airbag covers are strongly required to have good appearance and high stiffness. Since passenger airbag covers are larger than driver airbag covers, passenger airbag covers need high stiffness and require both better appearance and higher stiffness.

Under such a circumstance, the present disclosure is directed to a method for producing a thermoplastic elastomer composition that can form a molded article having both good appearance and high stiffness.

The inventors of the present disclosure have completed the present disclosure as a result of intensive studies in light of such a background.

Specifically, the present disclosure is directed to

[1]
A method for producing a thermoplastic elastomer composition, the method comprising the following first step and second step, wherein the produced thermoplastic elastomer composition contains 5 mass % or less of a mineral oil (C).

First step: a step of melt-kneading polypropylene (A-1) of which 20° C. xylene insoluble fraction has an intrinsic viscosity $[\eta_{cxis}]$ of 0.1 dl/g or more and less than 1.5 dl/g and an ethylene-based copolymer rubber (B) in the presence of an organic peroxide Second step: a step of further adding polypropylene (A-2) of which 20° C. xylene insoluble fraction has an intrinsic viscosity $[\eta_{cxis}]$ of 1.5 dl/g or more and 7 dl/g or less, and melt-kneading the resulting mixture The following [2] to [19] are preferred aspects or embodiments of the present disclosure.

[2]
The method for producing a thermoplastic elastomer composition according to [1], wherein the second step is carried out under conditions in which the organic peroxide is substantially absent.

[3]
The method for producing a thermoplastic elastomer composition according to [1] or [2], wherein the same extruder is used in the first step and the second step, the extruder has a plurality of supply ports, and the polypropylene (A-2) is supplied from a more downstream supply port.

[4]
The method for producing a thermoplastic elastomer composition according to any one of [1] to [3], wherein 0.1 to 15 parts by mass of the polypropylene (A-2) is supplied in the second step based on total 100 parts by mass of the polypropylene (A-1) and the ethylene-based copolymer rubber (B).

[5]
The method for producing a thermoplastic elastomer composition according to any one of [1] to [4], wherein 30 to 70 parts by mass of the polypropylene (A-1) and 70 to 30 parts by mass of the ethylene-based copolymer rubber (B) are supplied based on total 100 parts by mass of the polypropylene (A-1) and the ethylene-based copolymer rubber (B).

[6]
The method for producing a thermoplastic elastomer composition according to any one of [1] to [5], wherein at least part of the ethylene-based copolymer rubber (B) is amorphous ethylene/α-olefin copolymer (B1-1) or ethylene/α-olefin/non-conjugated diene copolymer (B1-2).

[7]
A thermoplastic elastomer composition produced by a production method comprising the following first step and second step, wherein the thermoplastic elastomer composition contains 5 mass % or less of a mineral oil (C):

First step: a step of melt-kneading polypropylene (A-1) and an ethylene-based copolymer rubber (B) in the presence of an organic peroxide, the polypropylene (A-1) being polypropylene of which 20° C. xylene insoluble fraction has an intrinsic viscosity $[\eta_{cxis}]$ of 0.1 dl/g or more and less than 1.5 dl/g; and Second step: a step of further adding polypropylene (A-2) of which 20° C. xylene insoluble fraction has an intrinsic viscosity $[\eta_{cxis}]$ of 1.5 dl/g or more and 7 dl/g or less, and melt-kneading the resulting mixture.

[8]
The thermoplastic elastomer composition according to [7], wherein the second step is carried out under conditions in which the organic peroxide is substantially absent.

[9]
The thermoplastic elastomer composition according to [7] or [8], wherein the same extruder is used in the first step and the second step, the extruder has a plurality of supply ports, and the polypropylene (A-2) is supplied from a more downstream supply port.

[10]
The thermoplastic elastomer composition according to any one of [7] to [9], wherein 0.1 to 15 parts by mass of the polypropylene (A-2) is supplied in the second step based on total 100 parts by mass of the polypropylene (A-1) and the ethylene-based copolymer rubber (B).

[11]
The thermoplastic elastomer composition according to any one of [7] to [10], wherein 30 to 70 parts by mass of the polypropylene (A-1) and 70 to 30 parts by mass of the ethylene-based copolymer rubber (B) are supplied based on total 100 parts by mass of the polypropylene (A-1) and the ethylene-based copolymer rubber (B).

[12]
The thermoplastic elastomer composition according to any one of [7] to [11], wherein at least part of the ethylene-based copolymer rubber (B) is amorphous ethylene/α-olefin copolymer (B1-1) or ethylene/α-olefin/non-conjugated diene copolymer (B1-2).

[13]

The thermoplastic elastomer composition according to any one of [7] to [12], wherein the thermoplastic elastomer composition is used in injection molding.

[14]

The thermoplastic elastomer composition according to any one of [7] to [13], wherein a molded article 90 mm wide×150 mm long×2.0 mm thick formed by injection-molding the thermoplastic elastomer composition according to any one of [7] to [13] at a cylinder temperature of 220° C., a mold temperature of 50° C., and an injection rate of 25 cm³/sec has a flexural modulus of 330 MPa or more as measured in accordance with JIS K7171.

[15]

A molded article comprising the thermoplastic elastomer composition according to any one of [7] to [14].

[16]

The molded article according to [15], wherein the molded article has a flexural modulus of 330 MPa or more as measured in accordance with JIS K7171.

[17]

The molded article according to [15] or [16], wherein the molded article is unpainted.

[18]

The molded article according to any one of [15] to [17], wherein the molded article is an airbag cover.

[19]

A method for producing a molded article which comprises a thermoplastic elastomer composition, the method comprising:

a step of mixing a thermoplastic elastomer composition with polypropylene (A-2) and molding the resulting mixture, the thermoplastic elastomer composition being produced by a production method comprising a step of melt-kneading polypropylene (A-1) and an ethylene-based copolymer rubber (B) in the presence of an organic peroxide. The polypropylene (A-1) is polypropylene of which 20° C. xylene insoluble fraction has an intrinsic viscosity $[\eta_{cxis}]$ of 0.1 dl/g or more and less than 1.5 dl/g and the polypropylene (A-2) is polypropylene of which 20° C. xylene insoluble fraction has an intrinsic viscosity $[\eta_{cxis}]$ of 1.5 dl/g or more and 7 dl/g or less.

According to the production method of the present disclosure, a thermoplastic elastomer composition that can form a molded article having both good appearance and high stiffness and that can be suitably used in various applications, such as airbag covers, can be produced.

DETAILED DESCRIPTION OF THE PREFERRED EMBODIMENTS

A method for producing a thermoplastic elastomer composition of the present disclosure includes the following first step and second step, wherein the produced thermoplastic elastomer composition contains 5 mass % or less of a mineral oil (C).

First step: a step of melt-kneading polypropylene (A-1) and an ethylene-based copolymer rubber (B) in the presence of an organic peroxide, the polypropylene (A-1) being polypropylene of which 20° C. xylene insoluble fraction has an intrinsic viscosity $[\eta_{cxis}]$ of 0.1 dl/g or more and less than 1.5 dl/g.

Second step: a step of further adding polypropylene (A-2) of which 20° C. xylene insoluble fraction has an intrinsic viscosity $[\eta_{cxis}]$ of 1.5 dl/g or more and 7 dl/g or less, and melt-kneading the resulting mixture.

Specifically, in the method for producing a thermoplastic elastomer composition of the present disclosure, polypropylene (A-1) of which 20° C. xylene insoluble fraction has an intrinsic viscosity $[\eta_{cxis}]$ of 0.1 dl/g or more and less than 1.5 dl/g, polypropylene (A-2) of which 20° C. xylene insoluble fraction has an intrinsic viscosity $[\eta_{cxis}]$ of 1.5 dl/g or more and 7 dl/g or less, the ethylene-based copolymer rubber (B), the organic peroxide are used as starting materials. The mineral oil (C) may be used as an optional component.

Each of the components will be described below.

Polypropylene (A-1) Of Which 20° C. Xylene Insoluble Fraction Has Intrinsic Viscosity $[\eta_{cxis}]$ of 0.1 dl/g or More and Less Than 1.5 dl/g The polypropylene (A-1) used as a starting material in the method for producing a thermoplastic elastomer composition of the present disclosure is a (co)polymer including more than 50 mass % and 100 mass % or less of a constitutional unit derived from propylene.

The polypropylene (A-1) is distinguished from the ethylene-based copolymer rubber (B) describe below in that the polypropylene (A-1) contains more than 50 mass % of the constitutional unit derived from propylene.

The polypropylene (A-1) is distinguished from the polypropylene (A-2) of which 20° C. xylene insoluble fraction has an intrinsic viscosity $[\eta_{cxis}]$ of 1.5 dl/g or more and 7 dl/g or less in that the 20° C. xylene insoluble fraction of the polypropylene (A-1) has an intrinsic viscosity $[\eta_{cxis}]$ of 0.1 dl/g or more and less than 1.5 dl/g.

The intrinsic viscosity $[\eta_{cxis}]$ of the 20° C. xylene insoluble fraction refers to the intrinsic viscosity $[\eta]$ of a 20° C. xylene insoluble fraction (hereinafter also referred to as a CXIS portion) as measured by the method described below, wherein the 20° C. xylene insoluble fraction is obtained by the following method.

Five grams of the polypropylene (A-1) is completely dissolved in 500 ml of boiling xylene. The resulting xylene solution is gradually cooled to 20° C. and conditioned at 20° C. for 4 hours or longer. The precipitate and the solution are separated by filtration. The precipitate is the CXIS portion.

The product obtained by removing the solvent from the solution is the CXS portion (20° C. xylene soluble fraction). The intrinsic viscosity of the CXS portion is also hereinafter referred to as $[\eta_{cxs}]$.

$[\eta_{cxs}]$ of the polypropylene (A-1) is preferably 0.1 dl/g or more and 8.0 dl/g or less, more preferably 0.3 dl/g or more and 7.0 dl/g or less. The ratio $[\eta_{cxs}]/[\eta_{cxis}]$ of $[\eta_{cxs}]$ to $[\eta_{cxis}]$ of the polypropylene (A-1) is preferably 0.01 or more and 12.0 or less, more preferably 0.05 or more and 11.0 or less.

The intrinsic viscosity is determined in the following manner. The reduced viscosity is measured in tetralin at 135° C. by using an Ubbelohde viscometer, and the intrinsic viscosity is determined from the obtained reduced viscosity by an extrapolation method in accordance with the calculation method described in "Polymer Solution, Polymer Experiment 11" (published by Kyoritsu Shuppan Co., Ltd., 1982), page 491.

The polypropylene (A-1) having $[\eta_{cxis}]$ of 0.1 dl/g or more and less than 1.5 dl/g is preferred in terms of the appearance, tensile strength, and other properties of molded bodies.

[η$_{cxis}$] of the polypropylene (A-1) is preferably 0.1 dl/g or more and less than 1.5 dl/g, more preferably 0.2 dl/g or more and less than 1.5 dl/g, still more preferably 0.3 dl/g or more and less than 1.5 dl/g.

[η$_{cxis}$] of the polypropylene (A-1) is appropriately adjusted by controlling the molecular weight, molecular weight distribution, tacticity, and other properties of the polypropylene (A-1).

Examples of the polypropylene (A-1) include a propylene homopolymer, propylene random copolymers, and propylene polymer materials described below. The polypropylene (A-1) may be composed of one of these, or may be composed of a mixture of two or more of these. From the viewpoint of the appearance and other properties of molded bodies, at least part of the polypropylene (A-1) used in the first step preferably includes a propylene random copolymer.

Examples of the propylene random copolymer include:

(1) a propylene-ethylene random copolymer including 90 mass % or more and 99.5 mass % or less of a constitutional unit derived from propylene and 0.5 mass % or more and 10 mass % or less of a constitutional unit derived from ethylene (provided that the total content of the constitutional unit derived from propylene and the constitutional unit derived from ethylene is 100 mass %);

(2) a propylene-ethylene-α-olefin random copolymer including 81 mass % or more and 99 mass % or less of a constitutional unit derived from propylene, 0.5 mass % or more and 9.5 mass % or less of a constitutional unit derived from ethylene, and 0.5 mass % or more and 9.5 mass % or less of a constitutional unit derived from an α-olefin having 4 to 10 carbon atoms (provided that the total content of the constitutional unit derived from propylene, the constitutional unit derived from ethylene, and the constitutional unit derived from an α-olefin having 4 to 10 carbon atoms is 100 mass %); and (3) a propylene-α-olefin random copolymer including 90 mass % or more and 99.5 mass % or less of a constitutional unit derived from propylene and 0.5 mass % or more and 10 mass % or less of a constitutional unit derived from an α-olefin having 4 to 10 carbon atoms (provided that the total content of the constitutional unit derived from propylene and the constitutional unit derived from an α-olefin having 4 to 10 carbon atoms is 100 mass %).

Examples of the α-olefin having 4 to 10 carbon atoms in the propylene-ethylene-α-olefin random copolymer and the propylene-α-olefin random copolymer include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, and 2,2,4-trimethyl-1-pentene.

Examples of the method for producing the propylene homopolymer and the propylene random copolymer include known polymerization methods using known catalysts for olefin polymerization, such as slurry polymerization, solution polymerization, bulk polymerization, and gas-phase polymerization using Ziegler-Natta catalysts or complex catalysts, such as metallocene complexes and non-metallocene complexes.

The propylene homopolymer may be produced in one polymerization reactor or may be produced by multi-step polymerization in a production facility in which multiple reactors are connected in series. In the case of producing the propylene homopolymer by multi-step polymerization, the propylene homopolymer produced in the upstream step and the propylene homopolymer produced in the downstream step may have the same intrinsic viscosity or different intrinsic viscosities.

The propylene polymer material contains a propylene homopolymer part (I) and an ethylene copolymer part (II) having a constitutional unit derived from at least one selected from the group consisting of propylene and α-olefins having 4 or more carbon atoms and a constitutional unit derived from ethylene. The propylene polymer material contains 70 mass % or more and 95 mass % or less of the propylene homopolymer part (I) and 5 mass % or more and 30 mass % or less of the ethylene copolymer part (II). From the viewpoint of the low-temperature impact resistance of molded bodies, the propylene polymer material preferably contains 75 mass % or more and 95 mass % or less of the propylene homopolymer part (I) and preferably contains 5 mass % or more and 25 mass % or less of the ethylene copolymer part (II) (provided that the total content of the propylene polymer material is 100 mass %).

Examples of the α-olefin having 4 or more carbon atoms in the ethylene copolymer part (II) include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. The α-olefin having 4 or more carbon atoms is preferably an α-olefin having 4 to 20 carbon atoms, more preferably an α-olefin having 4 to 10 carbon atoms, still more preferably 1-butene, 1-hexene, or 1-octene. These α-olefins having 4 or more carbon atoms may be used singly or in combination of two or more.

The content of the constitutional unit derived from ethylene in the ethylene copolymer part (II) is normally 22 mass % or more and 80 mass % or less, preferably 25 mass % or more and 70 mass % or less, more preferably 27 mass % or more and 60 mass % or less from the viewpoint of the low-temperature impact resistance of molded bodies. The content of the constitutional unit derived from at least one selected from the group consisting of propylene and α-olefins having 4 or more carbon atoms in the ethylene copolymer part (II) is normally 20 mass % or more and 78 mass % or less, preferably 30 mass % or more and 75 mass % or less, more preferably 40 mass % or more and 73 mass % or less (provided that the total content of the constitutional unit derived from at least one selected from the group consisting of propylene and α-olefins having 4 or more carbon atoms and the constitutional unit derived from ethylene is 100 mass %) from the viewpoint of the low-temperature impact resistance of molded bodies. The content of the constitutional unit derived from at least one selected from the group consisting of propylene and α-olefins having 4 or more carbon atoms and the content of the constitutional unit derived from ethylene can be determined by infrared spectroscopy.

Examples of the ethylene copolymer part (II) include propylene-ethylene copolymer, ethylene-(1-butene) copolymer, ethylene-(1-hexene) copolymer, ethylene-(1-octene) copolymer, propylene-ethylene-(1-butene) copolymer, propylene-ethylene-(1-hexene) copolymer, and propylene-ethylene-(1-octene) copolymer. The ethylene copolymer part (II) is preferably propylene-ethylene copolymer or propylene-ethylene-(1-butene) copolymer. The ethylene copolymer part (II) may be a random copolymer or a block copolymer.

The propylene polymer material can be produced by multi-step polymerization using a polymerization catalyst. For example, the propylene polymer material can be produced by producing the propylene homopolymer part (I) in the upstream polymerization step and producing the ethylene copolymer part (II) in the downstream polymerization step.

Examples of the polymerization catalyst used to produce the propylene polymer material include Ziegler catalyst systems; Ziegler-Natta catalyst systems; a catalyst system containing an alkylaluminoxane and a Group 4 transition metal compound having a cyclopentadienyl ring; and a catalyst system containing a Group 4 transition metal compound having a cyclopentadienyl ring, a compound that reacts with the transition metal compound to form an ionic complex, and an organoaluminum compound.

In the presence of the above catalyst system, a pre-polymerization catalyst may be used. Examples of the pre-polymerization catalyst include catalyst systems disclosed in JP-A-61-218606, JP-A-61-287904, JP-A-5-194685, JP-A-7-216017, JP-A-9-316147, JP-A-10-212319, and JP-A-2004-182981.

Examples of the polymerization method for producing the propylene polymer material include bulk polymerization, solution polymerization, slurry polymerization, and gas-phase polymerization. Examples of inert hydrocarbon solvents used in solution polymerization and slurry polymerization include propane, butane, isobutane, pentane, hexane, heptane, and octane. These polymerization methods may be used in combination of two or more, and may be batch methods or continuous methods. The polymerization method for producing the propylene polymer material is preferably continuous gas phase polymerization or bulk-gas phase polymerization in which bulk polymerization and gas phase polymerization are performed continuously.

The melt flow rate of the polypropylene (A-1) measured at 230° C. under a load of 21.18 N in accordance with JIS K 7210 is normally 10 g/10 min or more and 300 g/10 min or less and, from the viewpoint of the tensile strength and other properties of molded bodies, preferably 10 g/10 min or more and 100 g/10 min or less.

The isotactic pentad fraction of the polypropylene (A-1) measured by 13C-NMR is preferably 0.95 or more, more preferably 0.98 or more.

The isotactic pentad fraction refers to the fraction of propylene monomer units at the centers of isotactic chains in terms of pentad units in the molecular chain of the propylene-based polymer resin, in other words, the fraction of propylene monomer units in chains (hereinafter expressed by mmmm) of five successive meso-bonded propylene monomer units. The isotactic pentad fraction is measured by the method described in A. Zambelli et al., Macromolecules, 6, 925 (1973), that is, measured by 13C-NMR.

Specifically, the isotactic pentad fraction is the ratio of the area of an NMR peak assigned to mmmm to the area of an absorption peak in the methyl carbon region of the 13C-NMR spectrum.

The melting temperature of the polypropylene (A-1) is normally 100° C. or higher. The melting temperature of the propylene homopolymer and the propylene polymer material, which are preferred forms of the polypropylene (A-1), is preferably 155° C. or higher, more preferably 160° C. or higher. The melting temperature of the propylene random copolymer, which is another preferred form of the polypropylene (A-1), is preferably 130° C. or higher, more preferably 135° C. or higher. The melting temperature of the polypropylene (A-1) is normally 175° C. or higher. In the present disclosure, the melting temperature is a peak temperature of an endothermic peak having the highest peak temperature in a differential scanning calorimetry curve measured with a differential scanning calorimeter during heating operation. The conditions for measuring the differential scanning calorimetry curve with the differential scanning calorimeter are as described below.

Measurement Conditions

Cooling operation: the polypropylene (A-1) is melted at 220° C. and next cooled from 220° C. to −80° C. at a cooling rate of 10° C./min.

Heating operation: the polypropylene (A-1) is heated from −80° C. to 220° C. at 10° C./min immediately after being cooled from 220° C. to −80° C.

Polypropylene (A-2) of which 20° C. Xylene Insoluble Fraction has Intrinsic Viscosity $[\eta_{cxis}]$ of 1.5 or More and 7 or Less The polypropylene (A-2) used as a starting material in the method for producing a thermoplastic elastomer composition of the present disclosure is a (co)polymer including more than 50 mass % and 100 mass % or less of a constitutional unit derived from propylene. Examples of the polypropylene (A-2) include a propylene homopolymer, a propylene random copolymer, and a propylene polymer material described below. The polypropylene (A-2) may be composed of one (co)polymer, or may include two or more (co)polymers.

The polypropylene (A-2) is distinguished from the ethylene-based copolymer rubber (B) describe below in that the polypropylene (A-2) contains more than 50 mass % of the constitutional unit derived from propylene.

The polypropylene (A-2) is distinguished from the polypropylene (A-1) of which 20° C. xylene insoluble fraction described above has an intrinsic viscosity $[\eta_{cxis}]$ of 0.1 dl/g or more and less than 1.5 dl/g in that the 20° C. xylene insoluble fraction of the polypropylene (A-2) has an intrinsic viscosity $[\eta_{cxis}]$ of 1.5 dl/g or more and 7 dl/g or less. The method for separating the 20° C. xylene insoluble fraction (cxis portion) and the 20° C. xylene soluble fraction (cxs portion) of the polypropylene (A-2), and the method for measuring the intrinsic viscosities $[\eta_{cxis}]$ and $[\eta_{cxs}]$ are the same as those described above regarding the method for measuring the intrinsic viscosities $[\eta_{cxis}]$ and $[\eta_{cxs}]$ of the polypropylene (A-1).

By adding the polypropylene (A-2) having $[\eta_{cxis}]$ of 1.5 dl/g or more and 7 dl/g or less and melt-kneading the resulting mixture in the second step, a thermoplastic elastomer composition that can form a molded article having both good appearance and high stiffness can be produced. $[\eta_{cxis}]$ of the polypropylene (A-2) is preferably 1.5 dl/g or more and 7.0 dl/g or less, more preferably 1.7 dl/g or more and 7.0 dl/g or less, still more preferably 2.0 dl/g or more and 7.0 dl/g or less.

The melt flow rate of the polypropylene (A-2) measured at 230° C. under a load of 21.18 N in accordance with JIS K 7210 is normally 0.1 g/10 min or more and 10 g/10 min or less and, from the viewpoint of the stiffness and other properties of molded bodies, preferably 0.1 g/10 min or more and 8.0 g/10 min or less.

Other than the points described above, the details of typical or preferred monomer composition, physical properties, production method, and the like of the polypropylene (A-2) are the same as those described above regarding the polypropylene (A-1).

Ethylene-Based Copolymer Rubber (B)

The ethylene-based copolymer rubber (B), which is used as a starting material in the method for producing a thermoplastic elastomer composition of the present disclosure, is any co(polymer) that has an ethylene-derived constitutional unit as a main constitutional unit (50 mass % or more) and that can be cross-linked by using an organic peroxide.

The ethylene-based copolymer rubber (B) is preferably at least one ethylene-based copolymer selected from the group consisting of the following amorphous ethylene-based polymer (B1) and the following crystalline ethylene-based copolymer component (B2) having 50 mass % or more and less than 90 mass % of a constitutional unit derived from ethylene. Of these, the amorphous ethylene-based polymer (B1) is preferably used.

The ethylene-based copolymer rubber (B) may be composed of the component (B1) or may be composed of the component (B2). The ethylene-based copolymer rubber (B) may contain other components in addition to the component (B1) and/or the component (B2).

The content of the component (B1) and the content of the component (B2) described below are not limited. When the mass of the ethylene-based copolymer rubber (B) is 100 mass %, the content of the component (B1) may be 0 mass % or more and 100 mass % or less, and the content of the component (B2) may be 0 mass % or more and 100 mass % or less.

In one aspect, the content of the component (B1) may be 5 mass % or more and 85 mass % or less, and the content of the component (B2) may be 15 mass % or more and 95 mass % or less.

The ethylene-based polymer in the ethylene-based polymer component (B) is not limited other than any polymer including 50 mass % or more of a constitutional unit derived from ethylene. The ethylene-based polymer is preferably at least one ethylene-based polymer selected from the group consisting of the component (B1) and the component (B2) described below.

Amorphous Ethylene-Based Polymer (B1) The amorphous ethylene-based polymer (B1), which is preferably used as all or part of the ethylene-based copolymer rubber (B), is any ethylene-based polymer that includes 50 mass % or more of a constitutional unit derived from ethylene, that can be cross-linked by using an organic peroxide, and that is amorphous at ordinary temperature. The amorphous ethylene-based polymer (B1) is preferably, but not necessarily, an amorphous ethylene/α-olefin copolymer (B1-1) and/or an ethylene/α-olefin/non-conjugated diene copolymer (B1-2), which are described below in detail. The amorphous ethylene-based polymer (B1) can be determined to be amorphous when it has an enthalpy of fusion of 10 J/g or less in a temperature range of 70° C. or higher and 140° C. or lower as measured by differential scanning calorimetry.

Amorphous Ethylene/α-Olefin Copolymer (B1-1)

The amorphous ethylene/α-olefin copolymer (B1-1), which is preferably used as the ethylene-based copolymer rubber (B), is an amorphous ethylene copolymer including a constitutional unit derived from ethylene and a constitutional unit derived from at least one selected from the group consisting of propylene and α-olefins having 4 or more carbon atoms. Preferably, the amorphous ethylene/α-olefin copolymer (B1-1) includes 50 mass % or more and less than 95 mass % of a constitutional unit derived from ethylene and 5 mass % or more and 50 mass % or less of a constitutional unit derived from at least one selected from the group consisting of propylene and α-olefins having 4 or more carbon atoms (provided that the total amount of the amorphous ethylene/α-olefin copolymer (B1-1) is 100 mass %) and has a Mooney viscosity ($ML_{1+4}$, 125° C.) of 15 or more and 40 or less and a density of 0.850 g/cm³ or more and 0.890 g/cm³ or less. The amorphous ethylene/α-olefin copolymer (B1-1) may include two or more constitutional units derived from α-olefins having 4 or more carbon atoms.

The α-olefin having 4 or more carbon atoms in the amorphous ethylene/α-olefin copolymer (B1-1) is preferably an α-olefin having 4 to 8 carbon atoms, such as 1-butene, 2-methylpropylene, 1-pentene, 3-methyl-1-butene, 1-hexene, 4-methyl-1-pentene, or 1-octene. The α-olefin having 4 to 8 carbon atoms is preferably 1-butene, 1-hexene, or 1-octene.

In the amorphous ethylene/α-olefin copolymer (B1-1), the content of the constitutional unit derived from ethylene is preferably 50 mass % or more and less than 90 mass %, more preferably 52 mass % or more and 65 mass % or less, and the content of the constitutional unit derived from at least one selected from the group consisting of propylene and α-olefins having 4 or more carbon atoms is preferably 10 mass % or more and 50 mass % or less, more preferably 35 mass % or more and 48 mass % or less (provided that the total amount of the amorphous ethylene/α-olefin copolymer (B1-1) is 100 mass %).

The content of the constitutional unit derived from ethylene and the content of the constitutional unit derived from at least one selected from the group consisting of propylene and α-olefins having 4 or more carbon atoms in the amorphous ethylene/α-olefin copolymer (B1-1) can be determined by nuclear magnetic resonance (NMR).

Examples of the method for producing the amorphous ethylene/α-olefin copolymer (B1-1) include known polymerization methods using known catalysts for olefin polymerization, such as slurry polymerization, solution polymerization, bulk polymerization, and gas-phase polymerization using Ziegler-Natta catalysts or complex catalysts, such as metallocene complexes and non-metallocene complexes.

Ethylene/α-Olefin/Non-Conjugated Diene Copolymer (B1-2)

The ethylene/α-olefin/non-conjugated diene copolymer (B1-2), which is preferably used as the ethylene-based copolymer rubber (B), is a non-conjugated diene copolymer including a constitutional unit derived from ethylene, a constitutional unit derived from at least one selected from the group consisting of propylene and α-olefins having 4 or more carbon atoms, and a constitutional unit derived from a non-conjugated diene, wherein the content of the constitutional unit derived from ethylene is 50 mass % or more. Preferably, the ethylene/α-olefin/non-conjugated diene copolymer (B1-2) includes 25 mass % or more and 50 mass % or less of the constitutional unit derived from at least one selected from the group consisting of propylene and α-olefins having 4 or more carbon atoms (provided that the total content of the constitutional unit derived from ethylene and the constitutional unit derived from at least one selected from the group consisting of propylene and α-olefins having 4 or more carbon atoms is 100 mass %) and has an iodine value of 0.1 or more and 20 or less, a Mooney viscosity ($ML_{1+4}$, 125° C.) of 40 or more and 85 or less, and a molecular weight distribution (Mw/Mn) of 1.5 or more and 3.5 or less.

Examples of the method for producing the ethylene/α-olefin/non-conjugated diene copolymer (B1-2) include known polymerization methods using known catalysts for olefin polymerization, such as slurry polymerization, solution polymerization, bulk polymerization, and gas-phase polymerization using Ziegler-Natta catalysts or complex catalysts, such as metallocene complexes and non-metallocene complexes.

To regulate the molecular weight of the ethylene/α-olefin/non-conjugated diene copolymer (B1-2) to be produced, a molecular weight regulator, such as hydrogen, may be used.

The α-olefin having 4 or more carbon atoms in the non-conjugated diene copolymer of the ethylene/α-olefin/non-conjugated diene copolymer (B1-2) is preferably an α-olefin having 4 to 8 carbon atoms, such as 1-butene, 2-methylpropylene, 1-pentene, 3-methyl-1-butene, 1-hexene, 4-methyl-1-pentene, or 1-octene. The α-olefin having 4 to 8 carbon atoms is preferably 1-butene, 1-hexene, or 1-octene. These α-olefins having 4 or more carbon atoms may be used singly or in combination of two or more.

Examples of non-conjugated dienes for forming the constitutional unit derived from a non-conjugated diene include chain non-conjugated dienes, such as 1,4-hexadiene, 1,6-octadiene, 2-methyl-1,5-hexadiene, 6-methyl-1,5-heptadiene, and 7-methyl-1,6-octadiene; cyclic non-conjugated dienes, such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene; and trienes, such as 2,3-diisopropylidene-5-norbornene, 2-ethylidene-3-isopropylidene-5-norbornene, 2-propenyl-2,2-norbornadiene, 1,3,7-octatriene, and 1,4,9-decatriene. Preferred is 5-ethylidene-2-norbornene, 5-vinylnorbornene, or dicyclopentadiene.

The content of the constitutional unit derived from ethylene in the ethylene/α-olefin/non-conjugated diene copolymer (B1-2) is preferably 50 mass % or more and 75 mass % or less and, from the viewpoint of the low-temperature impact resistance of molded bodies, more preferably 50 mass % or more and 65 mass % or less. The content of the constitutional unit derived from at least one selected from the group consisting of propylene and α-olefins having 4 or more carbon atoms in the component (B1-2) is preferably 25 mass % or more and 50 mass % or less and, from the viewpoint of the low-temperature impact resistance of molded bodies, more preferably 35 mass % or more and 50 mass % or less (provided that the total content of the constitutional unit derived from ethylene, the constitutional unit derived from propylene, and the constitutional unit derived from α-olefins having 4 or more carbon atoms is 100 mass %).

The content of the constitutional unit derived from ethylene and the content of the constitutional unit derived from at least one selected from the group consisting of propylene and α-olefins having 4 or more carbon atoms in the ethylene/α-olefin/non-conjugated diene copolymer (B1-2) can be determined by nuclear magnetic resonance (NMR).

The Mooney viscosity ($ML_{1+4}$, 125° C.) of the ethylene/α-olefin/non-conjugated diene copolymer (B1-2) measured at 125° C. is preferably 40 or more and 85 or less, more preferably 43 or more and 75 or less, still more preferably 45 or more and 70 or less. The Mooney viscosity is measured in accordance with BSTM D-1646.

The iodine value of the ethylene/α-olefin/non-conjugated diene copolymer (B1-2) is preferably 0.1 or more and 20 or less and, from the viewpoint of the stiffness of molded bodies, more preferably 0.1 or more and 15 or less, still more preferably 0.1 or more and 10 or less. The iodine value refers to the number of grams of iodine used in the reaction between 100 g of a sample and iodine.

The iodine value of the non-conjugated diene copolymer can be determined by infrared spectroscopy.

The molecular weight distribution of the ethylene/α-olefin/non-conjugated diene copolymer (B1-2) is preferably 1.5 or more and 3.5 or less and, from the viewpoint of the low-temperature impact resistance of molded bodies, more preferably 1.5 or more and 3.0 or less, still more preferably 1.5 or more and 2.3 or less.

The molecular weight distribution refers to the ratio of the weight-average molecular weight (Mw) to the mass average molecular weight (Mn), that is, Mw/Mn, measured by gel permeation chromatography.

Component (B2): Crystalline Ethylene-Based Copolymer Including 50 mass % or More and Less Than 90 mass % of Constitutional Unit Derived from Ethylene The component (B2), which is preferably used as all or part of the ethylene-based copolymer rubber (B), is a crystalline ethylene-based copolymer including 50 mass % or more and less than 90 mass % of a constitutional unit derived from ethylene.

The component (B2) is an olefin-based block copolymer including an ethylene polymer block and an ethylene/α-olefin copolymer block. The component (B2) preferably has a crystal fusion peak at 70° C. to 140° C. and preferably has an enthalpy of fusion $\Delta H_{m2}$ of 10 to 70 J/g and more preferably has an enthalpy of fusion $\Delta H_{m2}$ of 30 to 50 J/g.

The enthalpy of fusion $\Delta H_{m2}$ of the component (B2) can be determined by analyzing, in accordance with the method specified in JIS K 7122-1987, part of a melting curve in a predetermined temperature range as measured by differential scanning calorimetry, more specifically can be measured and determined by, for example, the method described in Examples of the present disclosure.

The enthalpy of fusion $\Delta H_{m2}$ can be appropriately adjusted by controlling the amount of the ethylene polymer block. In general, the enthalpy of fusion $\Delta H_{m2}$ tends to decrease as the amount of the ethylene polymer block decreases.

The ethylene polymer block in the crystalline ethylene-based copolymer (B2) mainly includes an ethylene unit and may have a constitutional unit derived from other monomer in addition to the ethylene unit. Examples of the constitutional unit derived from other monomer include constitutional units derived from 1-propylene, 1-butene, 2-methylpropylene, 1-pentene, 3-methyl-1-butene, 1-hexene, 4-methyl-1-pentene, and 1-octene. Suitable examples include constitutional units derived from C3 to C8 α-olefins having a carbon-carbon double bond between terminal carbon atoms, such as 1-propylene, 1-butene, 1-hexene, and 1-octene. The component (B2) may be a copolymer of one α-olefin and ethylene or may be a copolymer of two or more α-olefins and ethylene.

Examples of the ethylene/α-olefin copolymer block in the crystalline ethylene-based copolymer (B2) include an ethylene/α-olefin copolymer block having, as constitutional units, an ethylene unit and an α-olefin unit, such as a 1-propylene, 1-butene, 2-methylpropylene, 1-pentene, 3-methyl-1-butene, 1-hexene, 4-methyl-1-pentene, or 1-octene unit. The α-olefin unit is preferably derived from a C4 to C8 α-olefin having a carbon-carbon double bond between terminal carbon atoms, such as 1-propylene, 1-butene, 1-hexene, and 1-octene. The component (B2) may be a copolymer of one α-olefin and ethylene or may be a copolymer of two or more α-olefins and ethylene. The crystalline ethylene-based copolymer (B2) may be used singly or in combination of two or more.

The content of the ethylene unit in the crystalline ethylene-based copolymer (B2) relative to the total content of the ethylene unit and the α-olefin unit is 50 mass % or more and less than 90 mass %, more preferably 50 mass % or more and 80 mass % or less. The content of the ethylene unit in the component (B2) is preferably high from the viewpoint of the high-temperature impact resistance of the crystalline ethylene-based copolymer (B2) or preferably low from the viewpoint of the low-temperature impact resistance. The content of the ethylene unit in the crystalline ethylene-based copolymer (B2) is more preferably 70 mass % or less. The content of the constitutional unit derived from ethylene and the content of the constitutional unit derived from at least one selected from the group consisting of propylene and α-olefins having 4 or more carbon atoms in the crystalline ethylene-based copolymer (B2) can be determined by nuclear magnetic resonance (NMR).

The ethylene/α-olefin copolymer that is the crystalline ethylene-based copolymer (B2) may have other constitutional unit, such as a non-conjugated diene-based constitutional unit (non-conjugated diene unit), in addition to the ethylene unit and the α-olefin unit having 3 to 8 carbon atoms. Examples of the non-conjugated diene include chain non-conjugated dienes, such as 1,4-hexadiene, 1,6-octadiene, 2-methyl-1,5-hexadiene, 6-methyl-1,5-heptadiene, and 7-methyl-1,6-octadiene; and cyclic non-conjugated dienes, such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene. Preferred are 5-ethylidene-2-norbornene and dicyclopentadiene.

When the crystalline ethylene-based copolymer (B2) has other constitutional unit, such as a non-conjugated diene unit, the content of other constitutional unit relative to the total content of the crystalline ethylene-based copolymer (B2) is normally 10 mass % or less, preferably 5 mass % or less. The content of the non-conjugated diene unit or the propylene unit can be determined by infrared spectroscopy.

Specific examples of the crystalline ethylene-based copolymer (B2) used in this embodiment include block copolymers including a crystalline ethylene polymer block and an ethylene/α-olefin copolymer block, such as ethylene-1-butene copolymer, ethylene-1-hexene copolymer, ethylene-1-octene copolymer, ethylene-propylene-1-butene copolymer, ethylene-propylene-1-hexene copolymer, or ethylene-propylene-1-octene copolymer. These block copolymers may be used singly or in combination of two or more. Among these, the crystalline ethylene-based copolymer (B2) is most preferably a block copolymer including an ethylene polymer block and an ethylene-1-octene copolymer block, that is, the crystalline ethylene-based copolymer (B2) is most preferably an olefin-based block copolymer including an ethylene polymer block and an ethylene-1-octene copolymer block.

The crystalline ethylene-based copolymer (B2) has a crystalline ethylene polymer block and also has amorphousness resulting from the ethylene/α-olefin copolymer block. The amorphousness is expressed by glass transition temperature, and the glass transition temperature determined by DSC is preferably −80° C. or higher, more preferably −75° C. or higher, and preferably −50° C. or lower, more preferably −60° C. or lower.

The melt flow rate (measured at a temperature of 190° C. under a load of 21.18 N) of the crystalline ethylene-based copolymer (B2) is not limited, but normally 10 g/10 min or less and, from the viewpoint of strength, preferably 8 g/10 min or less, more preferably 5 g/10 min or less, still more preferably 3 g/10 min or less. The melt flow rate of the crystalline ethylene-based copolymer (B2) is normally 0.01 g/10 min or more and, from the viewpoint of fluidity, preferably 0.05 g/10 min or more, more preferably 0.10 g/10 min or more. The melt flow rate of the component (B) is measured under the conditions of a temperature of 190° C. and a load of 21.18 N in accordance with BSTM D1238.

The density of the crystalline ethylene-based copolymer (B2) is preferably 0.880 g/cm$^3$ or less, more preferably 0.870 g/cm$^3$ or less from the viewpoint of low-temperature impact resistance. The lower limit of the density is not limited, but normally 0.850 g/cm$^3$ or more.

Examples of the method for producing the crystalline ethylene-based copolymer (B2) include synthesis according to the methods disclosed in JP-A-2007-529617, JP-A-2008-537563, and JP-A-2008-543978. For example, the crystalline ethylene-based copolymer (B2) can be produced through the process of: preparing a composition containing a mixture or reaction product obtained by combining a first olefin polymerization catalyst, a second olefin polymerization catalyst capable of preparing a polymer different in chemical properties and physical properties from a polymer prepared by the first olefin polymerization catalyst under equivalent polymerization conditions, and a chain shuttling agent; and contacting the ethylene and the α-olefin with the composition under addition polymerization conditions.

The synthesis of the crystalline ethylene-based copolymer (B2) preferably uses continuous solution polymerization. In continuous solution polymerization, catalyst components, a chain shuttling agent, monomers, and optionally a solvent, an adjuvant, a scavenger, and a polymerization aid are continuously supplied to the reaction zone, and the polymer product is continuously removed from the reaction zone. The block length can be changed by controlling, for example, the proportion and type of catalyst, the proportion and type of chain shuttling agent, and the polymerization temperature.

Other conditions in block copolymer synthesis are disclosed in JP-A-2007-529617, JP-A-2008-537563, and JP-A-2008-543978. Examples of commercial products include Engage (registered trademark)-XLT series and INFUSE (registered trademark) series available from The Dow Chemical Company.

Organic Peroxide

An organic peroxide is used in the first step of the method for producing a thermoplastic elastomer composition of the present disclosure. Since an organic peroxide decomposes, the organic peroxide may be absent in the produced thermoplastic elastomer composition. Preferably, the organic peroxide is substantially absent in the second step as described below.

The organic peroxide functions as a cross-linker to cross-link the ethylene-based copolymer rubber (B) mainly through melt-kneading in the first step and break the molecular chain of the polypropylene (A-1), which provides a thermoplastic elastomer composition having rubber elasticity and thermoplasticity or its precursor.

Examples of organic peroxides include ketone peroxides, diacyl peroxides, hydroperoxides, dialkyl peroxides, peroxy ketals, alkyl peresters, percarbonates, peroxy dicarbonate, and peroxy esters.

Specific examples of suitable organic peroxides include dicumyl peroxide, 2,5-dimethyl-2,5-di(t-butylperoxy)hexane, 2,5-dimethyl-2,5-di(t-butylperoxy)hexyne, 1,3-bis(t-butylperoxyisopropyl)benzene, t-butylcumyl peroxide, di-t-butyl peroxide, 2,2,4-trimethylpentyl-2-hydroperoxide, diisopropylbenzene hydroperoxide, cumene peroxide, t-butyl peroxide, 1,1-di(t-butylperoxy)3,5,5-trimethylcyclohexane, 1,1-di-t-butylperoxycyclohexane, isobutyl peroxide, 2,4-dichlorobenzoyl peroxide, o-methylbenzoyl peroxide, bis-3,5,5-trimethylhexanoyl peroxide, lauroyl peroxide, benzoyl peroxide, and p-chlorobenzoyl peroxide; and combinations of two or more of these.

The amount of the organic peroxide used is not limited and appropriately set such that the ethylene-based copolymer rubber (B) can be sufficiently cross-linked in the first step and excessive decomposition of the polypropylenes (A-1) and (A-2) is prevented.

For example, the amount of the organic peroxide used based on 100 parts by mass of the total amount of the polypropylene (A-1) and the ethylene-based copolymer rubber (B) is preferably 0.01 to 0.3 parts by mass, more preferably 0.05 to 0.28 parts by mass.

The cross-linker may be supplied in the first step as it is, or may be supplied in the form of solution or dispersion in mineral oil.

Cross-Linking Aid

A cross-linking aid is preferably used together with the organic peroxide in the method for producing a thermoplastic elastomer composition of the present disclosure. The use of the cross-linking aid causes cross-linking in the first step to proceed quickly and uniformly and can thus produce a thermoplastic elastomer composition with higher quality.

Suitable examples of the cross-linking aid include peroxide cross-linking aids, such as N,N'-m-phenylene bismaleimide, toluylene bismaleimide, p-quinone dioxime, nitrosobenzene, diphenylguanidine, and trimethylolpropane; and polyfunctional vinyl monomers, such as divinylbenzene, ethylene glycol dimethacrylate, polyethylene glycol dimethacrylate, trimethylolpropane trimethacrylate, and allyl methacrylate.

Mineral Oil (C)

In the method for producing a thermoplastic elastomer composition of the present disclosure, the mineral oil (C) may be used as long as the produced thermoplastic elastomer composition contains 5 mass % or less of the mineral oil (C).

Since the presence of 5 mass % or less of the mineral oil (C) effectively suppresses bleed-out of the mineral oil (C) and the like from the thermoplastic elastomer composition, the thermoplastic elastomer composition can be suitably used for automotive interiors, such as airbag covers, used in a high-temperature environment.

The use of the mineral oil (C), or mixing of the ethylene-based copolymer rubber (B) with the mineral oil (C), makes it easier to mix or melt-knead starting materials and makes it easier to, for example, improve the uniformity and control the microstructure of the composition.

The amount of the mineral oil (C) used based on 100 mass % of the entire amount of the thermoplastic elastomer composition is preferably 0.1 to 5.0 mass %, more preferably 0.5 to 4.0 mass %.

Suitable examples of the mineral oil (C) include paraffinic mineral oils, naphthenic mineral oils, and aromatic mineral oils. Paraffinic mineral oils are particularly preferred. The mineral oil (C) may be added in melt-kneading the polypropylene (A-1) and the ethylene-based copolymer rubber (B), or the mineral oil (C) may be premixed with one of these components before the melt-kneading. Examples of the method for mixing the ethylene-based copolymer rubber (B) and the mineral oil (C) include a method (1) involving mixing a solid of the ethylene-based copolymer (B) and the mineral oil (C) in a mixer, and a method (2) involving mixing a solution of the ethylene-based copolymer (B) and the mineral oil (C) to form a mixture and then removing the solvent from the mixture.

In this specification, the term "mineral oil" refers to a substance in liquid form or grease form at ordinary temperature, which is produced from a hydrocarbon compound derived from petroleum and is composed of at least one compound selected from the group consisting of aromatic compounds, naphthenic ring compounds, and paraffinic compounds.

Other Components

In the method for producing a thermoplastic elastomer composition of the present disclosure, various additives may be added in addition to the components described above.

Examples of additives include oligomers or polymers other than the polypropylene (A-1), the polypropylene (A-2), the ethylene-based copolymer rubber (B), and the mineral oil (C); softeners, other than the mineral oil (C), inorganic fillers (e.g., talc, calcium carbonate, calcined kaolin, glass fiber, hollow glass microspheres, silica, metal soap, titanium dioxide, mica, potassium titanate fiber), organic fillers (e.g., fiber, wood flour, cellulose powder, carbon fiber, carbon black), lubricants (e.g., silicone oil, silicone gum), antioxidants (e.g., phenolic, sulfur, phosphorus, lactone, and vitamin antioxidants), weather stabilizers, UV absorbers (e.g., benzotriazole, triazine, anilide, and benzophenone UV absorbers), heat stabilizers, light stabilizers (e.g., hindered amine and benzoate light stabilizers), pigments (e.g., inorganic pigments, organic pigments, pigment dispersants), nucleating agents, foaming agents, foaming nucleating agents, plasticizers, flame retardants, brightening agents, antibiotics, light diffusing agents, adsorbents (e.g., metal oxides (e.g., zinc oxide, magnesium oxide), wetting/dispersing agents, VOC/odor stripping agents, water storage agents (e.g., an aqueous medium containing an amphipathic polymer), scratch resistance improvers, and metal chlorides (e.g., iron chloride, calcium chloride), hydrotalcite, aluminates). These additives may be used singly or in combination of two or more.

Examples of resins other than the polypropylene (A-1), the polypropylene (A-2), the ethylene-based copolymer rubber (B), and the mineral oil (C) include olefin resins (excluding olefin resins corresponding to the polypropylene (A-1), the polypropylene (A-2), the ethylene-based copolymer rubber (B), and the mineral oil (C)), olefin elastomers (excluding olefin elastomers corresponding to the polypropylene (A-1), the polypropylene (A-2), the ethylene-based copolymer rubber (B), and the mineral oil (C)), a hydrogenated product of a block copolymer including a polymer block of a monovinyl-substituted aromatic hydrocarbon compound and a polymer block of a conjugated diene compound, polyphenylene ether resins, polyamide resins, polyester resins, polyoxymethylene resins, and polymethylmethacrylate resins.

Examples of olefin resins include functionalized ethylene-based polymers, such as ethylene-vinyl acetate ("EVA"), polymers having maleic anhydride grafted to polyolefins, such as polypropylene, and ethylene acrylate copolymers, such as ethylene methyl acrylate ("EMA").

Production of Thermoplastic Elastomer Composition

First Step

The first step in the method for producing a thermoplastic elastomer composition of the present disclosure involves melt-kneading polypropylene (A-1) of which 20° C. xylene insoluble fraction has an intrinsic viscosity [$\eta_{cxis}$] of 0.1 dl/g or more and less than 1.5 dl/g and an ethylene-based copolymer rubber (B) in the presence of an organic peroxide.

In the first step, the polypropylene (A-1), the ethylene-based copolymer rubber (B), and other optional components, such as the mineral oil (C) and various additives (e.g., cross-linking aid) are melt-kneaded in the presence of an organic peroxide by an ordinary method using, for example, a common extruder, a Bunbury mixer, a roll, a Brabender Plastograph, or a kneader Brabender. The thermoplastic elastomer composition is preferably produced by using an extruder, particularly a twin screw extruder. All of the components may be melt-kneaded at once, some of the components may be kneaded first and then mixed with the rest of the components followed by melt-kneading, or the components may be melt-kneaded once or twice or more times. The melt-kneading temperature in the first step is preferably 150 to 300° C., more preferably 180 to 250° C. The melt-kneading time is preferably 5 seconds to 30 minutes, more preferably 20 seconds to 20 minutes. The components for kneading may be added in any order or may be added at the same time.

Melt-kneading in the presence of an organic peroxide, preferably under the above conditions, causes cross-linking of the ethylene-based copolymer rubber (B) to produce rubber elasticity and breaks the main chain of the polypropylene (A-1) to maintain fluidity (thermoplasticity). This process provides the thermoplastic elastomer composition having rubber elasticity and thermoplasticity. The resin composition obtained in the first step is also referred to as a "thermoplastic elastomer composition precursor" because the resin composition obtained in the first step may have a composition, physical properties, and other properties different from those of a desired thermoplastic elastomer composition.

Second Step

The second step involves further adding, to the thermoplastic elastomer composition precursor obtained in the first step, polypropylene (A-2) of which 20° C. xylene insoluble fraction has an intrinsic viscosity [$\eta_{cxis}$] of 1.5 dl/g or more and 7 dl/g or less, and melt-kneading the resulting mixture. The stiffness of the produced thermoplastic elastomer composition is further improved by further adding the polypropylene (A-2).

More specifically, a specimen of an injection-molded article produced under the following conditions from a thermoplastic elastomer composition obtained by the production method of the present disclosure is placed symmetrically with respect to two supports so as to form a right angle with the indenter and the supports in accordance with JIS K7171. The flexural modulus measured at a test speed of 1 mm/min in a standard atmosphere of 23° C./50% RH is preferably 330 MPa or higher, more preferably 340 MPa or higher, still more preferably 350 MPa or higher.

Molding method: injection molding
Cylinder temperature: 220° C.
Mold temperature: 50° C.
Injection rate: 25010/sec
Molded article size: 90 mm wide×150 mm long×2.0 mm thick The conditions of the second step are not limited. Preferably, the second step involves introducing the thermoplastic elastomer composition precursor obtained in the first step and the polypropylene (A-2) of which 20° C. xylene insoluble fraction has an intrinsic viscosity [$\eta_{cxis}$] of 1.5 dl/g or more and 7 dl/g or less, preferably to an extruder similar to that in the first step, which is a twin screw extruder, more preferably to the same extruder as that used in the first step.

The melt-kneading temperature in the second step is preferably 150 to 300° C., more preferably 180 to 250° C. The heat treatment time is not limited, but preferably 5 seconds to 30 minutes, more preferably 10 seconds to 10 minutes.

The second step is preferably carried out under the conditions in which the organic peroxide is substantially absent. Since substantially no cross-linking or decomposition of resin components, particularly the polypropylene (A-2), occurs in the second step, the resin composition, the molecular weight distribution, the gel fraction, and the like of the thermoplastic elastomer composition can thus be adjusted with a high degree of freedom. For example, decomposition of the polypropylene (A-2), which is easily decomposed by an organic peroxide, can be prevented, and it is thus easier to control stiffness and other properties by adding the polypropylene (A-2).

Since the organic peroxide is decomposed by melt-kneading, substantially all of the organic peroxide is preferably decomposed by melt-kneading in the first step in order to carry out the second step with substantially no organic peroxide. The melt-kneading temperature in the first step is particularly preferably 190° C. to 250° C. The heat treatment time is not limited, but preferably 5 seconds to 30 minutes, more preferably 10 seconds to 10 minutes.

To decompose substantially all of the organic peroxide through melt-kneading in the first step, the amount of the organic peroxide used in the first step based on 100 parts by mass of the total amount of the polypropylene (A-1) and the ethylene-based copolymer rubber (B) is preferably 0.01 to 0.3 parts by mass, more preferably 0.05 to 0.28 parts by mass.

From the viewpoint of costs and smooth transfer of the molten material to the second step, the first step and the second step are preferably carried out in the same extruder as described above. Preferably, the extruder has a plurality of supply ports, the first step is carried out by supplying the polypropylene (A-1), the ethylene-based copolymer rubber (B), and the organic peroxide from a first supply port located most upstream, and the second step is carried out by supplying the polypropylene (A-2) from a supply port located more downstream and mixing the polypropylene (A-2) with the thermoplastic elastomer composition precursor obtained in the first step.

In the method for producing a thermoplastic elastomer composition of the present disclosure, the amount of each component used is not limited, but the amount of the polypropylene (A-2) supplied based on total 100 parts by mass (the mass of mineral oil is not included and, when the ethylene-based copolymer rubber (B) is mixed with mineral oil, the mass of mineral oil is subtracted) of the polypropylene (A-1) and the ethylene-based copolymer rubber (B) in the second step is preferably 0.1 to 15 parts by mass, more preferably 1.0 to 10 parts by mass in order to, for example, appropriately control the physical properties of the thermoplastic elastomer composition.

To, for example, produce the thermoplastic elastomer composition precursor having a suitable structure in the first step, 30 to 70 parts by mass of the polypropylene (A-1) and 70 to 30 parts by mass of the ethylene-based copolymer rubber (B) are preferably used, and 40 to 60 parts by mass of the polypropylene (A-1) and 60 to 40 parts by mass of the ethylene-based copolymer rubber (B) are particularly preferably used, based on total 100 parts by mass of the polypropylene (A-1) and the ethylene-based copolymer rubber (B).

The thermoplastic elastomer composition produced by the production method of the present disclosure is used in various applications, and application of the thermoplastic elastomer composition is not limited. The thermoplastic elastomer composition can be particularly preferably used to produce injection molded bodies, particularly injection molded bodies used without painting, because orientation of the cross-linked rubber particles is unlikely to occur in narrow parts of a mold or the like during injection molding, which can effectively prevent an adverse effect on appearance.

Since the thermoplastic elastomer composition of this embodiment can form a molded article having both good appearance and high stiffness, the thermoplastic elastomer composition is preferably used in applications requiring these properties. Examples of applications include, but are not limited to, automotive parts, industrial machinery parts, electronic and electrical device parts, and building materials.

The thermoplastic elastomer composition is particularly preferably used for, among the applications described above, automotive interior parts to be used in a wide range of temperatures, particularly airbag covers, which require good appearance and high stiffness, are molded with a mold having many narrow parts, and are often used without painting. Since passenger airbag covers are typically large in size and thus require higher stiffness, passenger airbag covers are suitable applications of the thermoplastic elastomer composition of this embodiment.

In this embodiment, the thermoplastic elastomer composition of this embodiment can be molded into an airbag cover by using, for example, an ordinary injection molding method or, as needed, various molding methods, such as gas injection molding, injection compression molding, and short-shot foam molding. Regarding the molding conditions in the injection molding, the molding temperature is normally 100° C. to 300° C., preferably 150° C. to 280° C., the injection pressure is 5 to 100 MPa, preferably 10 to 80 MPa, and the mold temperature is 20° C. to 80° C., preferably 20° C. to 60° C.

EXAMPLES

The physical properties were evaluated by the following methods in Examples and Comparative Examples.

Measurement of Physical Properties

1. Melt Flow Rate (MFR)

The melt flow rate was measured under the conditions of 190° C. or 230° C. and a load of 21.18 N in accordance with the method B in JIS K 7210.

2. Enthalpies of Fusion $\Delta H_{m2}$

The enthalpy of fusion $\Delta H_{m2}$ in a temperature range of 70° C. or higher and 140° C. or lower was determined as a heat of fusion by analyzing, in accordance with the method specified in JIS K 7122-1987, part of a melting curve in a temperature range of 70° C. or higher and 140° C. or lower as measured by differential scanning calorimetry described below.

The crystal melting peak temperature in a temperature range of 70° C. or higher and 140° C. or lower was determined as a temperature at the top of a melting peak obtained by analyzing, in accordance with the method specified in JIS K 7121-1987, the melting curve in a temperature range of 70° C. or higher and 140° C. or lower as measured by differential scanning calorimetry described below.

The glass transition temperature is a midpoint glass transition temperature determined by analyzing, in accordance with the method specified in JIS K 7121-1987, the melting curve measured by differential scanning calorimetry described below.

The peak temperature of an endothermic peak having the highest peak temperature in a differential scanning calorimetry curve measured with a differential scanning calorimeter during heating operation is defined as a melting temperature.

Measurement Conditions

A sample is melted at 220° C. and next cooled from 220° C. to −80° C. at a cooling rate of 10° C./min.

Heating operation: the polypropylene (A-1) is heated from −80° C. to 220° C. at 10° C./min immediately after being cooled from 220° C. to −80° C.

3. Intrinsic Viscosity of 20° C. Xylene Soluble and Insoluble Fractions ([ηcxs], [ηcxis], unit: dl/g)

About 5 g of the sample was completely dissolved in 500 ml of boiling xylene. The resulting xylene solution was thus gradually cooled to 20° C. and conditioned at 20° C. for 4 hours or longer. The precipitate and the solution were then separated by filtration. The precipitate was a CXIS portion, and the product obtained by removing the solvent from the solution was a CXS portion.

The reduced viscosity was measured in tetralin at 135° C. by using an Ubbelohde viscometer, and the intrinsic viscosity was determined from the obtained reduced viscosity by an extrapolation method in accordance with the calculation method described in "Polymer Solution, Polymer Experiment 11" (published by Kyoritsu Shuppan Co., Ltd., 1982), page 491.

4. Isotactic Pentad Fraction

The isotactic pentad fraction was determined by carrying out nuclear magnetic resonance (NMR) under the following conditions (1) to (7) and calculating the ratio of the area of an NMR peak assigned to mmmm to the area of an NMR peak in the methyl carbon region in accordance with the method described in the literature (Macromolecules, 6, 925 (1973)).

(1) System: Avance III HD600 available from Bruker Corporation
(10 mm CryoProbe)
(2) Measurement solvent: 1,2-dichlorobenzene-d4/1,2-dichlorobenzene
(20/80 volume ratio)
(3) Measurement temperature: 130° C.
(4) Measurement method: proton decoupling method
(5) Pulse width: 45 degrees
(6) Pulse repetition time: 4 seconds
(7) Reference of chemical shift: tetramethylsilane 5. Content of Constitutional Unit Derived from Ethylene and Content of Constitutional Unit Derived from at Least One Selected from Group Consisting of Propylene and α-Olefins Having 4 or More Carbon Atoms in Non-Conjugated Diene Copolymer in Component (B)

The non-conjugated diene copolymer was formed into a film with a thickness of about 0.1 mm by using a hot-press machine, and the infrared absorption spectrum of the film was measured by using an infrared spectrophotometer (IR-810 available from JASCO Corporation). From the infrared absorption spectrum, the content of the constitutional unit derived from ethylene and the content of the constitutional unit derived from at least one selected from the group consisting of propylene and α-olefins having 4 or more carbon atoms in the non-conjugated diene copolymer were determined in accordance with the method described in the literature "Characterization of Polyethylene from Infrared Absorption Spectrum, Takayama, Usami, et al." or "Die Makromolekulare Chemie, 177, 461 (1976), Mc Rae, M. A., Madam S, W. F. et al."

6. Iodine Value of Non-Conjugated Diene Copolymer in Component (B)

The non-conjugated diene copolymer was formed into a film with a thickness of about 0.5 mm by using a hot-press machine. The intensities of the peak (absorption peak at 1611 cm2) from dicyclopentadiene and the peak (absorption peak at 1688 cm2) from 5-ethylidene-2-norbornene in the film were measured by using an infrared spectrophotometer.

The molar content of double bonds was determined from the peak intensities, and the iodine value was calculated from the molar content.

7. Molecular Weight Distribution

The molecular weight distribution (Mw/Mn) was calculated by measuring the weight-average molecular weight (Mw) and the number-average molecular weight (Mn) by gel permeation chromatography (GPC) under the following conditions (1) to (9).

(1) Apparatus: HLC-8121 GPC/HT available from Tosoh Corporation (2) Separation column: three columns GMHHR-H(S)HT available from Tosoh Corporation (3) Measurement temperature: 140° C.

(4) Carrier: ortho-dichlorobenzene (5) Flow rate: 1.0 mL/min (6) Sample concentration: about 1 mg/mL (7) Sample injection volume: 400 μL (8) Detector: differential refractometer (9) Molecular weight standard substance: standard polystyrene 8. Mooney Viscosity The Mooney viscosity was measured at 125° C. in accordance with ASTM D-1646.

9. Density (unit: g/cm$^3$)

The density was measured without annealing in accordance with JIS K 7112.

10. Content of Constitutional Unit Derived from Ethylene in Ethylene Copolymer of Component (A), Component (B), and Component (C) (Unit: Mass %)

The content of the constitutional unit derived from ethylene in the ethylene copolymer was determined by carrying out nuclear magnetic resonance (NMR) under the following conditions (1) to (7) in accordance with the method described in the literature (JMS-REV. MACROMOL. CHEM. PHYS., C29, 201-317 (1989)) (provided that the total amount of the ethylene copolymer was 100 mass %).

(1) System: Avance III HD600 available from Bruker Corporation (10 mm CryoProbe)

(2) Measurement solvent: 1,1,2,2-tetrachloroethane-d2/1,2-dichlorobenzene (15/85 volume ratio)

(3) Measurement temperature: 135° C.

(4) Measurement method: proton decoupling method (5) Pulse width: 45 degrees (6) Pulse repetition time: 4 seconds (7) Reference of chemical shift: tetramethylsilane 11. Method for Producing Injection-Molded Article Injection-molded bodies, 90 mm long, 150 mm wide, and 2.0 mm thick, were produced by injection-molding the thermoplastic elastomer compositions according to Examples and Comparative Examples using a side gate plate mold in an injection molding machine EC 160NII available from Toshiba Corporation under the conditions of a cylinder temperature of 220° C., a mold temperature of 50° C., and an injection rate of 25 cm$^3$/sec.

12. Stiffness (Flexural Modulus)

The flexural modulus of the injection-molded bodies produced above in section 11 was measured in accordance with JIS K 7171. The measurement atmosphere was a standard atmosphere of 23° C./50% RH in accordance with JIS K7100.

13. Low-Temperature Impact Resistance (IZOD Impact Strength)

The impact resistance of the injection-molded bodies produced above in section 11 was measured in accordance with JIS K 7110. The measurement was carried out at −45° C.

The measurement results were evaluated as described below.

Figure 1:
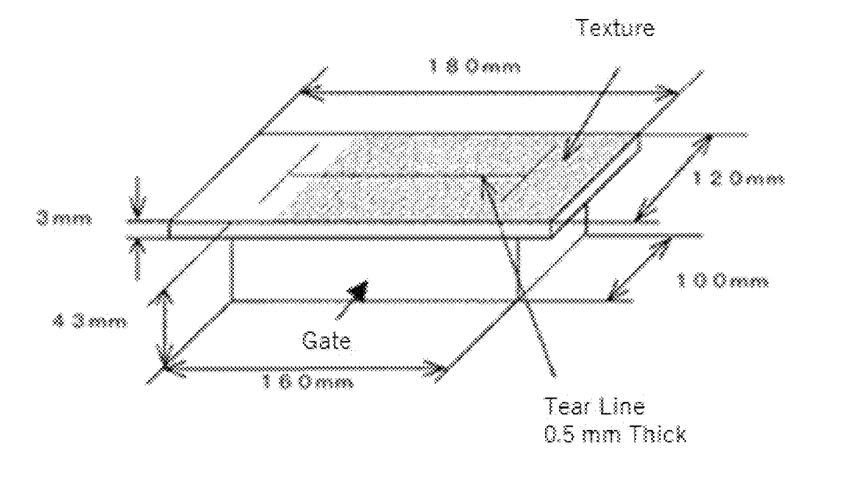
FIG. 1 illustrates a molded article used for evaluating appearance of Examples.

P (partial break): an incomplete break that does not meet the definition of hinge break H (hinge break): an incomplete break such that both specimen parts are held together by only a thin surface layer in the form of a hinge having no bending stiffness C (complete break): a specimen breaks into two or more pieces 14. Appearance Injection Molded Bodies for Evaluating Appearance The thermoplastic elastomer compositions of Examples and Comparative Examples were molded into a box-shaped molded article having a tear line 0.5 mm thick at a cylinder temperature of 230° C. and a mold temperature of 70° C. by using an injection molding machine (product name: EC160NII100-EN available from Toshiba Corporation) (see FIG. 1). The uneven gloss on the surface of the tear line of the obtained molded article was visually observed and evaluated on the basis of the following criteria.

A: No uneven gloss

B: Unnoticeable or almost no uneven gloss

C: Clear uneven gloss

Materials

The details of starting materials used in Examples/Comparative Examples are as described below.

Polypropylene (A)

(A-1-i) Propylene homopolymer (h-PP)

MFR (230° C.)=40 g/10 min, $[\eta_{cxis}]$=1.25 dl/g (A-1-ii) Heterophasic propylene polymer material (NOBLEN WPX5343 available from Sumitomo Chemical Co., Ltd.) composed of propylene homopolymer (I) and ethylene-propylene copolymer (II) and produced by multi-step polymerization (MFR=60 g/10 min; melting temperature=163.5° C.; $[\eta cxs]$=5.3 dl/g; $[\eta cxs]/[\eta cxis]$=4.5; isotactic pentad fraction=0.98)

Content of propylene homopolymer (I)=87 mass %;

Content of ethylene-propylene copolymer (II)=13 mass %

Content of monomer unit derived from ethylene of ethylene-propylene copolymer (II)=32 mass %

Content of monomer unit derived from propylene of ethylene-propylene copolymer (II)=68 mass %

(A-1-iii) Heterophasic propylene polymer material (NOBLEN AZ564 available from Sumitomo Chemical Co., Ltd.) composed of propylene homopolymer (I) and ethylene-propylene copolymer (II) and produced by multi-step polymerization (MFR=28.5 g/10 min; melting temperature=164.6° C.; $[\eta_{cxs}]$=2.4 dl/g; $[\eta_{cxs}]/[\eta_{cxis}]$=2.1; isotactic pentad fraction=0.98)

Content of propylene homopolymer (I)=87 mass %;

Content of ethylene-propylene copolymer (II)=13 mass %

Content of monomer unit derived from ethylene of ethylene-propylene copolymer (II)=46 mass %

Content of monomer unit derived from propylene of ethylene-propylene copolymer (II)=52 mass %

(A-1-iv) Ethylene-Propylene Copolymer

NOBLEN Z144CE4 available from Sumitomo Chemical Co., Ltd.

(MFR=27 g/10 min, [ηcxis]=1.4 dl/g; melting temperature=141° C.)

Content of monomer unit derived from propylene=96 mass %;

Content of monomer unit derived from ethylene=4 mass %;

(A-2-i) Propylene Homopolymer (h-PP)

MFR (230° C.)=0.5 g/10 min, $[\eta_{cxis}]$=3.0 dl/g (A-2-ii) Propylene Homopolymer (h-PP)

(A-2-ii) is a propylene homopolymer produced by multi-step polymerization. (A-2-ii) is a mixture of a propylene homopolymer component b1 produced in the upstream step and a propylene homopolymer component b2 produced in the downstream step. The content of the propylene homopolymer component b1 in the upstream step was 18 mass %, and the content of the propylene homopolymer component b2 in the downstream step was 82 mass %.

MFR (230° C.)=11 g/10 min, melting temperature=165° C., $[\eta_{cxis}]_{total}$ of entire (A-2-ii)=2.0 dl/g, $[\eta_{cxis}]$ of b1=7.0 dl/g, $[\eta_{cxis}]$ of b2=0.92 dl/g Ethylene-Based Copolymer Rubber (B)

(B1-1-i) Ethylene-1-octene Copolymer

Engage 8842 available from The Dow Chemical Company

Enthalpy of fusion $\Delta H_{m2}$ in temperature range of 70° C. or higher and 140° C. or lower as measured by differential scanning calorimetry=0 J/g, content of constitutional unit derived from ethylene=55 mass %, content of constitutional unit derived from 1-octene=45 mass %, Mooney viscosity $(ML_{1+4}, 125° C.)$=23, density=0.857 g/cm³

(B1-1-ii) Ethylene-1-butene Copolymer

Engage 7487 available from The Dow Chemical Company

Content of monomer unit derived from ethylene=69.1 mass %, content of monomer unit derived from 1-butene=30.9 mass %, iodine value=0, molecular weight distribution=1.9, proportion of eluate at elution temperature of −15° C. measured by CFC=24.3 mass % of total elution amount (B1-2-i) Ethylene-Propylene-5-Ethylidene-2-Norbornene Copolymer Preparation Method To a first polymerization tank made of stainless steel and equipped with a stirrer, hexane, ethylene, and propylene were supplied at rates of 408 g/(hr·L), 25.4 g/(hr·L), and 117.7 g/(hr·L) per unit time·unit polymerization tank volume, respectively. After being mixed and stirred in a line mixer, VOCl₃ and ethanol were supplied to the polymerization tank at rates of 26.5 mg/(hr·L) and 12.7 mg/(hr·L) (VOCl₃/ethanol=1/1.8 (molar ratio)), respectively. Ethylaluminum sesquichloride (EASC) and hydrogen were supplied to the polymerization tank at rates of 158.7 mg/(hr·L) and 0.05 NL/(hr·L), respectively. Moreover, 5-ethylidene-2-norbornene was supplied to the polymerization tank at a rate of 0.5 g/(hr·L). The polymerization tank was maintained at a temperature of 41° C. In the polymerization tank, 38 g/(hr·L) of a non-conjugated diene copolymer was produced per unit time unit polymerization tank volume. Next, a polymerization solution taken from the first polymerization tank was fed to a second polymerization tank made of stainless steel, equipped with a stirrer, and having the same volume as the first polymerization tank. Hexane, ethylene, and propylene were supplied at rates of 204 g/(hr·L), 15.2 g/(hr·L), and 100.4 g/(hr·L) per unit time·unit polymerization tank volume, respectively. After being mixed and stirred in a line mixer, VOCl₃ and ethanol were supplied to the polymerization tank at rates of 16.7 mg/(hr·L) and 8.0 mg/(hr·L) (VOCl₃/ethanol=1/1.8 (molar ratio)), respectively. Ethylaluminum sesquichloride (EASC) was supplied to the polymerization tank at a rate of 66.8 mg/(hr·L). The polymerization tank was maintained at a temperature of 45° C. In the second polymerization tank, 19 g/(hr·L) of a non-conjugated diene copolymer was produced per unit time·unit polymerization tank volume.

With regard to the non-conjugated diene copolymer produced by the above preparation method, the Mooney viscosity $(ML_{1+4}, 125° C.)$, the content of the constitutional unit derived from ethylene, the content of the constitutional unit derived from propylene, the iodine value, and the molecular weight distribution are as described below.

Mooney viscosity $(ML_{1+4}, 125° C.)$=65, MFR (190° C., 21.18 N)=0.5 g/10 min, content of constitutional unit derived from ethylene=55 mass %, content of constitutional unit derived from propylene=45 mass %, iodine value=2.1, molecular weight distribution=1.9, enthalpy of fusion $\Delta H_{m2}$ in temperature range of 70° C. or higher and 140° C. or lower as measured by differential scanning calorimetry=0 J/g (B1-2-ii) Ethylene-propylene-5-ethylidene-2-norbornene Copolymer Preparation Method To a first polymerization tank made of stainless steel and equipped with a stirrer, hexane, ethylene, and propylene were supplied at rates of 705 g/(hr·L), 36.4 g/(hr·L), and 89.2 g/(hr·L) per unit time·unit polymerization tank volume, respectively. After being mixed and stirred in a line mixer, VOCl₃ was supplied to the polymerization tank at a rate of 30.4 mg/(hr·L). Ethylaluminum sesquichloride (EASC) and hydrogen were supplied to the polymerization tank at rates of 182.7 mg/(hr·L) and 0.08 NL/(hr·L), respectively. Moreover, 5-ethylidene-2-norbornene was supplied to the polymerization tank at a rate of 0.5 g/(hr·L). The polymerization tank was maintained at a temperature of 45° C. In the polymerization tank, 44 g/(hr·L) of a non-conjugated diene copolymer was produced per unit time·unit polymerization tank volume.

Next, a polymerization solution taken from the first polymerization tank was fed to a second polymerization tank made of stainless steel, equipped with a stirrer, and having the same volume as the first polymerization tank. Hexane, ethylene, and propylene were supplied at rates of 259 g/(hr·L), 21.4 g/(hr·L), and 75.0 g/(hr·L) per unit·unit polymerization tank volume, respectively. After being mixed and stirred in a line mixer, VOCl₃ was supplied to the polymerization tank at a rate of 30.9 mg/(hr·L). Ethylaluminum sesquichloride (EASC) was supplied to the polymerization tank at a rate of 92.8 mg/(hr·L). The polymerization tank was maintained at a temperature of 56° C. In the second polymerization tank, 22 g/(hr·L) of a non-conjugated diene copolymer was produced per unit time·unit polymerization tank volume.

With regard to the non-conjugated diene copolymer produced by the above preparation method, the Mooney viscosity $(ML_{1+4}, 125° C.)$, the content of the monomer unit derived from ethylene, the content of the monomer unit derived from propylene, the iodine value, the molecular weight distribution, and the proportion of the eluate at an elution temperature of −15° C. measured by CFC are as described below.

Mooney viscosity $(ML_{1+4}, 125° C.)$=46, content of monomer unit derived from ethylene=67 mass %, content of monomer unit derived from propylene=33 mass %, iodine value=3, molecular weight distribution=2.2, proportion of eluate at elution temperature of −15° C. measured by CFC=41.8 mass % of total elution amount (B2-1) Olefin Block Copolymer (OBC)

Product name "Engage XLT8677" available from The Dow Chemical Company

Crystal melting peak temperature=118° C., enthalpy of fusion $\Delta H_{m2}$ in temperature range of 70° C. or higher and 140° C. or lower as measured by differential scanning calorimetry=42 J/g, MFR (190° C., 21.18 N)=0.5 g/10 min, glass transition temperature (DSC method)=−67° C., density=0.870 g/cm$^3$, content of constitutional unit derived from ethylene=52 mass %, content of constitutional unit derived from 1-octene=48 mass %

(C-1) Paraffinic mineral oil (Product name: Diana Process Oil PW-380 Idemitsu Kosan Co., Ltd.)

APO10-DL: agent (APO10-DL available from Kayaku Akzo Corporation) containing 10 mass % of 2,5-dimethyl-2,5-di(t-butylperoxy)hexane (cross-linker) and 90 mass % of paraffin oil HiCross MS50: agent (HiCross MS50 available from Seiko Chemical Co., Ltd.) containing 50 mass % of trimethylolpropane trimethacrylate (cross-linking aid) and 50 mass % of silica Antioxidant: Sumilizer GP available from Sumitomo Chemical Co., Ltd.

Example 1

To 24.1 parts by mass of propylene-based polymer (A-1-i) were added 50 parts by mass of ethylene-propene-5-ethylidene-2-norbornene copolymer (B1-2-i1), 20.9 parts by mass of ethylene-propylene copolymer (C-1), 2.8 parts by mass of APO10-DL, 0.8 parts by mass of HiCross MS50, and 0.2 parts by mass of antioxidant. The resulting mixture was melt-kneaded at a cylinder temperature of 200° C. in the upstream process in a twin screw extruder, and 5 parts by mass of propylene-based polymer (A-2-i) was melt-kneaded at a cylinder temperature of 200° C. in the downstream process in the twin screw extruder to produce a thermoplastic elastomer composition. The produced thermoplastic elastomer composition was injection-molded into a molded article by the method described in section 11. The measurement results of the physical properties of the molded article are shown in Table 1.

Examples 2 to 5 and Comparative Examples 1 to 7

A thermoplastic elastomer composition was produced in the same manner as in Example 1 except that the components and the contents are as shown in Table 1. The amount of the antioxidant not described in Table is the same as that in Example 1.

The produced thermoplastic elastomer composition was injection-molded into a molded article by the method described in section 11. The measurement results of the physical properties of the molded article are shown in Table 1.

TABLE 1

| Step | Composition | | | Example 1 | Example 2 | Example 3 | Example 4 | Example 5 | Comparative Example 1 | Comparative Example 2 |
|---|---|---|---|---|---|---|---|---|---|---|
| First | Component (A) | (A-1-i) | | 24.1 | 19.1 | 19.1 | | | 24.1 | 24.1 |
| | | (A-1-ii) | WPX5343 | | | | 20 | 20 | | |
| | | (A-1-iii) | AZ564 | | | | | | | |
| | | (A-1-iv) | Z144CE4 | 20.9 | 20.9 | 20.9 | 30 | 25 | 20.9 | 20.9 |
| | | (A-2-i) | | | | | | | | 5 |
| | Component (B) | (B1-1-i) | E8842 | | | | 10 | 10 | | |
| | | (B1-1-ii) | E7487 | | | | | | | |
| | | (B1-2-i) | | 50 | 50 | | 35 | 35 | 50 | 50 |
| | | (B1-2-ii) | | | | | | | | |
| | | (B2-i) | XLT8677 | | | 50 | | | | |
| | Component (C) | (C-1) | PW380 | | | | | | | |
| | | APO-10DL | | 2.8 | 2.8 | 2.8 | 1.8 | 1.8 | 2.8 | 2.8 |
| | | HiCross MS50 | | 0.8 | 0.8 | 0.8 | 0.51 | 0.51 | 0.8 | 0.8 |
| | (A-1)/((A-1) + (B)) | | parts by mass/100 parts by mass | 47.4 | 44.4 | 44.4 | 52.6 | 50.0 | 47.4 | 47.4 |
| | (B)/((A-1) + (B)) | | parts by mass/100 parts by mass | 52.6 | 55.6 | 55.6 | 47.4 | 50.0 | 52.6 | 52.6 |
| Second | Component (A) | (A-1-i) | | | | | | | 5 | |
| | | (A-2-i) | | 5 | 10 | 10 | | | | |
| | | (A-2-ii) | | | | | 5 | 10 | | |
| | (A-2)/((A-1) + (B)) | | parts by mass/100 parts by mass | 5.3 | 11.1 | 11.1 | 5.3 | 11.1 | 0.0 | 0.0 |
| Stiffness | | | MPa | 353 | 390 | 351 | 428 | 500 | 297 | 280 |
| Low-temperature impact resistance | | | −45° C. Break state | P | P | P | P | P | P | P |
| Appearance | | | Visual Evaluation | A | A | A | A | A | A | A |

| Step | Composition | | | Comparative Example 3 | Comparative Example 4 | Comparative Example 5 | Comparative Example 6 | Comparative Example 7 |
|---|---|---|---|---|---|---|---|---|
| First | Component (A) | (A-1-i) | | 19.1 | 19.1 | 50 | | |
| | | (A-1-ii) | WPX5343 | | | | 28.5 | |
| | | (A-1-iii) | AZ564 | | | | | 35 |
| | | (A-1-iv) | Z144CE4 | 20.9 | 20.9 | | 30 | 20 |
| | | (A-2-i) | | 10 | 10 | 10 | | |

TABLE 1-continued

| | | | | | | | |
|---|---|---|---|---|---|---|---|
| Component (B) | (B1-1-i) | E8842 | | | | | 20 |
| | (B1-1-ii) | E7487 | | | | | 20 |
| | (B1-2-i) | | 50 | | 40 | | |
| | (B1-2-ii) | | | | | 37 | |
| | (B2-i) | XLT8677 | | 50 | | | |
| Component (C) | (C-1) | PW380 | | | | 4.5 | |
| | | APO-10DL | 2.8 | 2.8 | 2.8 | 2 | 2 |
| | | HiCross MS50 | 0.8 | 0.8 | 0.8 | 0.8 | 0.8 |
| | (A-1)/((A-1) + (B)) | parts by mass/100 parts by mass | 44.4 | 44.4 | 55.6 | 61.3 | 57.9 |
| | (B)/((A-1) + (B)) | parts by mass/100 parts by mass | 55.6 | 55.6 | 44.4 | 38.7 | 42.1 |
| Second | Component (A) (A-1-i) | | | | | | |
| | (A-2-i) | | | | | | |
| | (A-2-ii) | | | | | | |
| | (A-2)/((A-1) + (B)) | parts by mass/100 parts by mass | 0.0 | 0.0 | 0.0 | 0.0 | 0.0 |
| Stiffness | | MPa | 280 | 274 | 584 | 300 | 300 |
| Low-temperature impact resistance | | −45° C. Break state | P | P | C | C | C |
| Appearance | | Visual Evaluation | A | A | C | B | B |

In Table, the amount of each component is expressed by parts by mass unless otherwise specified.

According to the method for producing a thermoplastic elastomer composition of the present disclosure, a thermoplastic elastomer composition that can form a molded article having both good appearance and high stiffness can be produced. The thermoplastic elastomer composition can thus be suitably used to produce molded bodies requiring good appearance and high stiffness, such as airbag covers, and has high industrial applicability in various fields, such as automotive and other transport equipment industries, sports and leisure goods industry, household goods industry, electrical and electronic equipment industry, and construction industry.

What is claimed is:

1. A method for producing a thermoplastic elastomer composition, wherein the produced thermoplastic elastomer composition contains 5 mass % or less of a mineral oil (C), the method comprising:
   a first step of melt-kneading polypropylene (A-1) and an ethylene-based copolymer rubber (B) in the presence of an organic peroxide, the polypropylene (A-1) being polypropylene of which 20° C. xylene insoluble fraction has an intrinsic viscosity $[\eta_{cxis}]$ of 0.1 dl/g or more and less than 1.5 dl/g; and
   a second step of further adding polypropylene (A-2) of which 20° C. xylene insoluble fraction has an intrinsic viscosity $[\eta_{cxis}]$ of 1.5 dl/g or more and 7 dl/g or less, and
   melt-kneading the resulting mixture.

2. The method for producing a thermoplastic elastomer composition according to claim 1, wherein the second step is carried out under conditions in which the organic peroxide is substantially absent.

3. The method for producing a thermoplastic elastomer composition according to claim 1, wherein the same extruder is used in the first step and the second step, the extruder has a plurality of supply ports, and the polypropylene (A-2) is supplied from a more downstream supply port.

4. The method for producing a thermoplastic elastomer composition according to claim 1, wherein 0.1 to 15 parts by mass of the polypropylene (A-2) is supplied in the second step based on total 100 parts by mass of the polypropylene (A-1) and the ethylene-based copolymer rubber (B).

5. The method for producing a thermoplastic elastomer composition according to claim 1, wherein 30 to 70 parts by mass of the polypropylene (A-1) and 70 to 30 parts by mass of the ethylene-based copolymer rubber (B) are supplied based on total 100 parts by mass of the polypropylene (A-1) and the ethylene-based copolymer rubber (B).

6. The method for producing a thermoplastic elastomer composition according to claim 1, wherein at least part of the ethylene-based copolymer rubber (B) is amorphous ethylene/α-olefin copolymer (B1-1) or ethylene/α-olefin/non-conjugated diene copolymer (B1-2).

7. A thermoplastic elastomer composition, wherein the thermoplastic elastomer composition contains 5 mass % or less of a mineral oil (C), the composition produced by the following method:
   a first step of melt-kneading polypropylene (A-1) and an ethylene-based copolymer rubber (B) in the presence of an organic peroxide, the polypropylene (A-1) being polypropylene of which 20° C. xylene insoluble fraction has an intrinsic viscosity $[\eta_{cxis}]$ of 0.1 dl/g or more and less than 1.5 dl/g; and
   a second step of further adding polypropylene (A-2) of which 20° C. xylene insoluble fraction has an intrinsic viscosity $[\eta_{cxis}]$ of 1.5 dl/g or more and 7 dl/g or less, and
   melt-kneading the resulting mixture.

8. The thermoplastic elastomer composition according to claim 7, wherein the second step is carried out under conditions in which the organic peroxide is substantially absent.

9. The thermoplastic elastomer composition according to claim 7, wherein the same extruder is used in the first step and the second step, the extruder has a plurality of supply ports, and the polypropylene (A-2) is supplied from a more downstream supply port.

10. The thermoplastic elastomer composition according to claim 7, wherein 0.1 to 15 parts by mass of the polypropylene (A-2) is supplied in the second step based on total 100 parts by mass of the polypropylene (A-1) and the ethylene-based copolymer rubber (B).

11. The thermoplastic elastomer composition according to claim 7, wherein 30 to 70 parts by mass of the polypropylene (A-1) and 70 to 30 parts by mass of the ethylene-based copolymer rubber (B) are supplied based on total 100 parts by mass of the polypropylene (A-1) and the ethylene-based copolymer rubber (B).

12. The thermoplastic elastomer composition according to claim 7, wherein at least part of the ethylene-based copolymer rubber (B) is amorphous ethylene/α-olefin copolymer (B1-1) or ethylene/α-olefin/non-conjugated diene copolymer (B1-2).

13. The thermoplastic elastomer composition according to claim 7, wherein the thermoplastic elastomer composition is used in injection molding.

14. A molded article 90 mm wide×150 mm long×2.0 mm thick formed by injection-molding the thermoplastic elastomer composition according to claim 7 at a cylinder temperature of 220° C., a mold temperature of 50° C., and an injection rate of 25 cm$^3$/sec has a flexural modulus of 330 MPa or more as measured in accordance with JIS K7171.

15. A molded article comprising the thermoplastic elastomer composition according to claim 7.

16. The molded article according to claim 15, wherein the molded article has a flexural modulus of 330 MPa or more as measured in accordance with JIS K7171.

17. The molded article according to claim 15, wherein the molded article is unpainted.

18. The molded article according to claim 15, wherein the molded article is an airbag cover.

19. A method for producing a molded article which comprises a thermoplastic elastomer composition, the method comprising:
a step of mixing a thermoplastic elastomer composition with polypropylene (A-2) and molding the resulting mixture, the thermoplastic elastomer composition being produced by a production method comprising a step of melt-kneading polypropylene (A-1) and an ethylene-based copolymer rubber (B) in the presence of an organic peroxide, the polypropylene (A-1) being polypropylene of which 20° C. xylene insoluble fraction has an intrinsic viscosity $[\eta_{cxis}]$ of 0.1 dl/g or more and less than 1.5 dl/g, the polypropylene (A-2) being polypropylene of which 20° C. xylene insoluble fraction has an intrinsic viscosity $[\eta_{cxis}]$ of 1.5 dl/g or more and 7 dl/g or less.

* * * * *